(12) United States Patent
Gianolio et al.

(10) Patent No.: US 6,807,937 B2
(45) Date of Patent: Oct. 26, 2004

(54) MULTI-CYLINDER DIESEL ENGINE WITH VARIABLY ACTUATED VALVES

(75) Inventors: Laura Gianolio, Orbassano (IT);
Lorentino Macor, Orbassano (IT);
Andrea Pecori, Orbassano (IT);
Costantino Vafidis, Orbassano (IT);
Francesco Vattaneo, Orbassano (IT)

(73) Assignee: C.R.F. Societa Consortile per Azioni, Turin (IT)

( * ) Notice: Subject to any disclaimer, the term of this patent is extended or adjusted under 35 U.S.C. 154(b) by 193 days.

(21) Appl. No.: 10/183,632

(22) Filed: Jun. 28, 2002

(65) Prior Publication Data

US 2003/0005898 A1 Jan. 9, 2003

(30) Foreign Application Priority Data

Jul. 6, 2001 (IT) ..................................... TO2001A0660

(51) Int. Cl.⁷ ........................ F02M 35/10; F02M 25/07
(52) U.S. Cl. .................. 123/308; 123/315; 123/568.14; 123/90.12
(58) Field of Search ........................... 123/90.12, 90.15, 123/90.16, 568.14, 302, 308, 315

(56) References Cited

U.S. PATENT DOCUMENTS

| | | | |
|---|---|---|---|
| 4,424,790 A | | 1/1984 | Curtil |
| 5,140,955 A | * | 8/1992 | Sono et al. ............... 123/90.15 |
| 5,918,577 A | * | 7/1999 | Martelli et al. ............. 123/295 |
| 6,053,136 A | * | 4/2000 | Albanello et al. ......... 123/90.16 |
| 6,237,551 B1 | | 5/2001 | Macor et al. |
| 6,318,348 B1 | * | 11/2001 | Xu .......................... 123/568.14 |
| 6,321,715 B1 | * | 11/2001 | Dong .......................... 123/295 |
| 6,321,731 B1 | | 11/2001 | Russ et al. |
| 6,386,177 B2 | * | 5/2002 | Urushihara et al. .......... 123/299 |
| 6,390,057 B2 | * | 5/2002 | Yoshizawa et al. .......... 123/295 |
| 6,427,653 B1 | * | 8/2002 | Hara et al. ................ 123/90.17 |
| 6,439,195 B1 | * | 8/2002 | Warner ........................ 123/321 |
| 6,497,213 B2 | * | 12/2002 | Yoshizawa et al. .......... 123/299 |
| 6,718,945 B2 | * | 4/2004 | Doria et al. ................. 123/432 |
| 2004/0000287 A1 | * | 1/2004 | Borean ........................ 123/432 |

FOREIGN PATENT DOCUMENTS

| | | | |
|---|---|---|---|
| EP | 0 961 018 A1 | 12/1999 | |
| JP | 288038 | * 10/1998 | ........... F02B/23/06 |

* cited by examiner

*Primary Examiner*—Henry C. Yuen
*Assistant Examiner*—Hai Huynh
(74) *Attorney, Agent, or Firm*—Sughrue Mion, PLLC

(57) ABSTRACT

In a Diesel engine with variably actuated valves, the cam controlling each inlet valve is shaped to provoke the opening of the respective inlet valve during the engine's normal exhaust phase and thus realize exhaust gas recirculation within the engine, due to the fact that during the normal exhaust phase, part of the exhaust gas passes from the cylinder into the inlet port, from where it returns to the cylinder during the next induction phase, while part of the exhaust gas that had previously passed into the exhaust port returns to the cylinder during the induction phase due to the additional opening of the exhaust valve, in consequence of which the exhaust gas charges that return to the cylinder are subjected to further combustion in the next engine cycle.

10 Claims, 6 Drawing Sheets

Fig_1

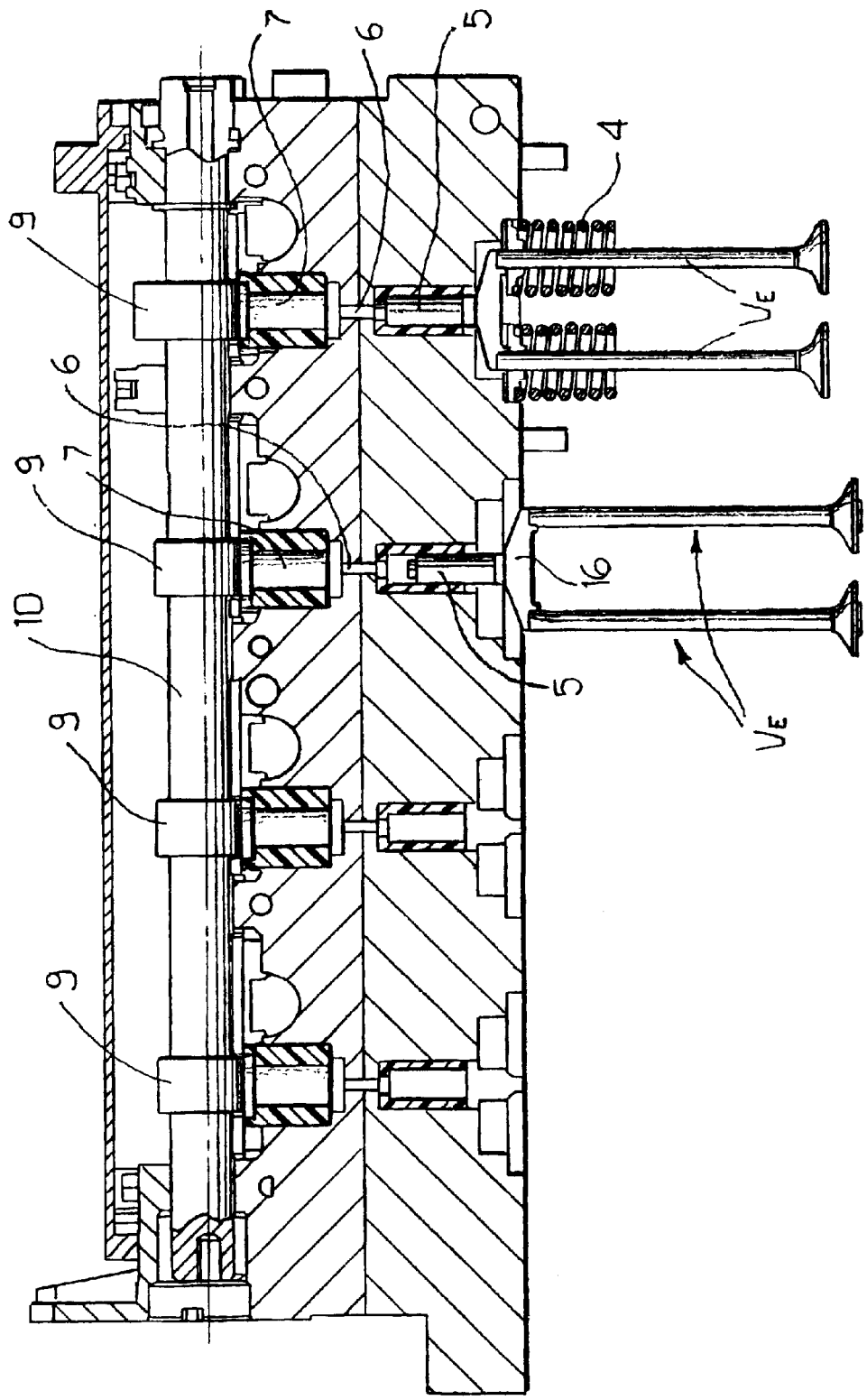

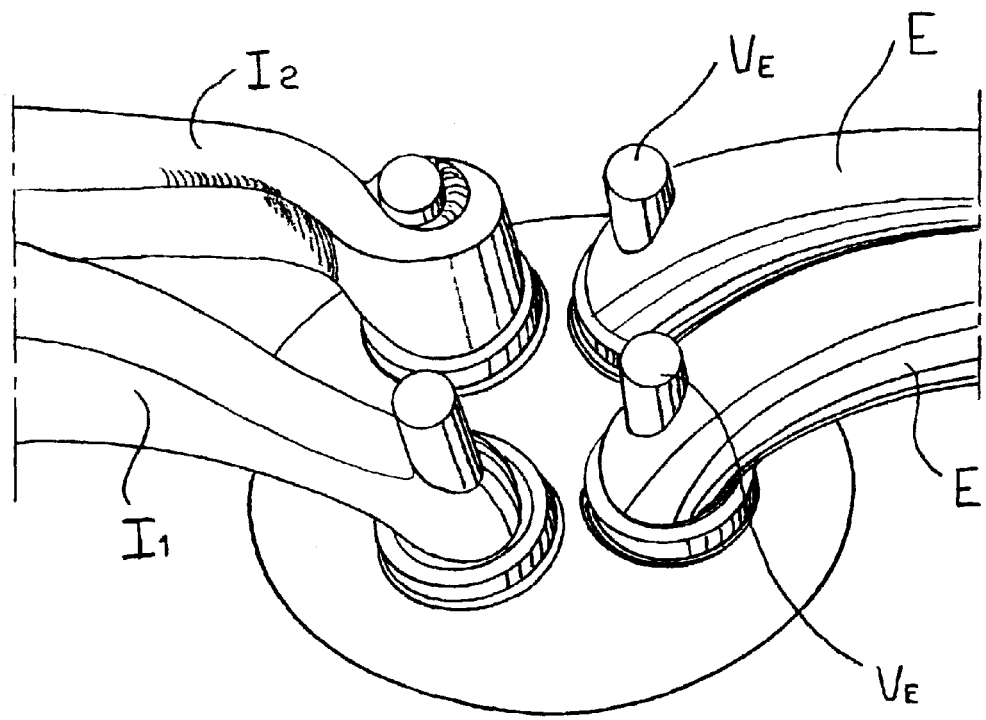
Fig_4
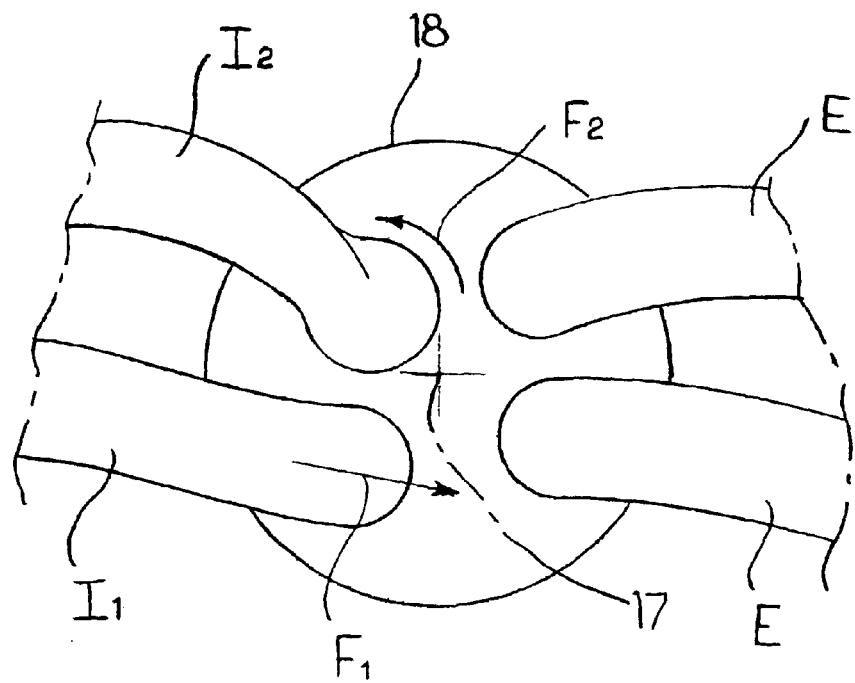
Fig_5

Fig_6
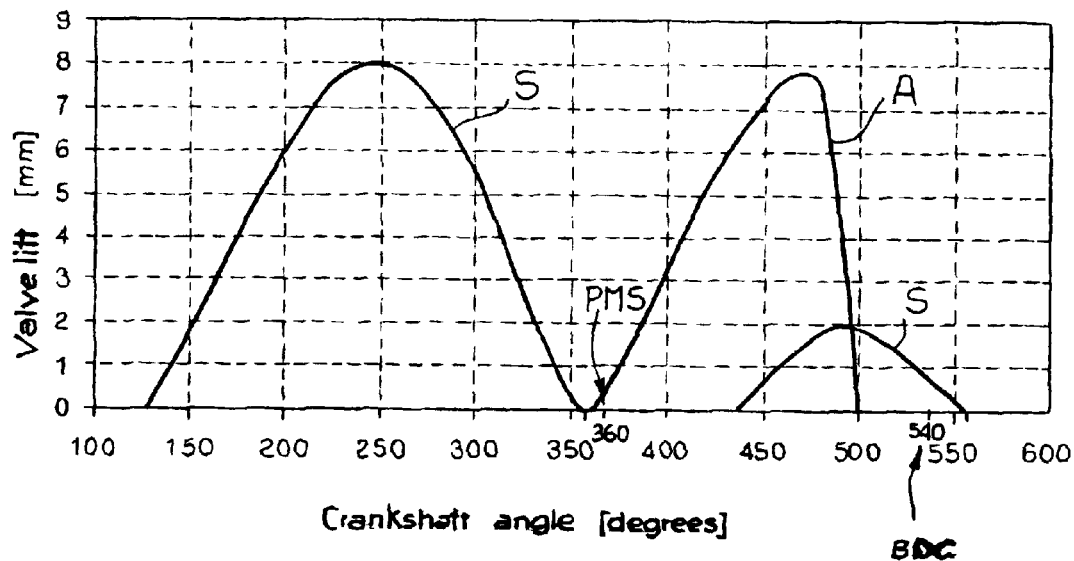
Fig_7
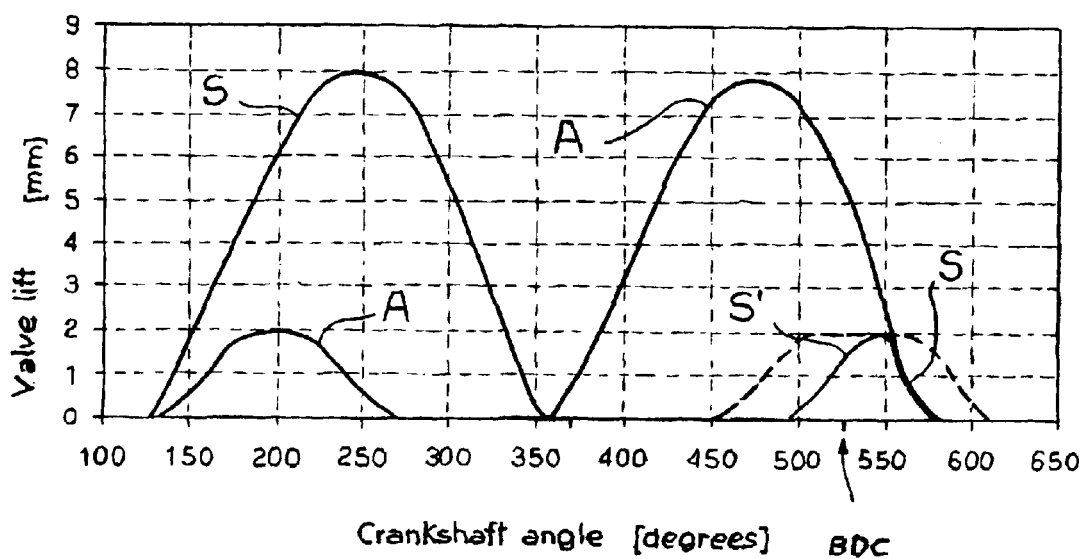

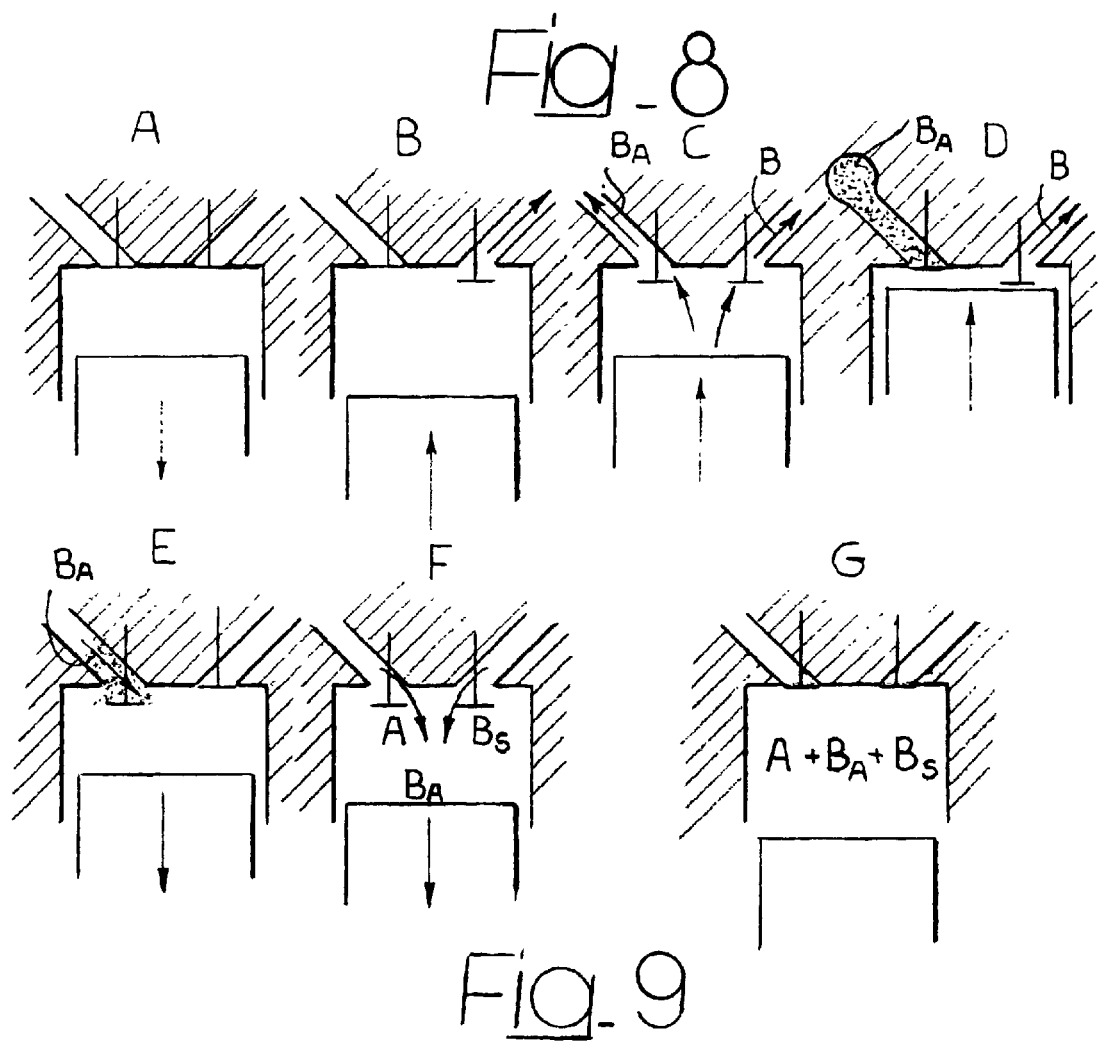
Fig_8
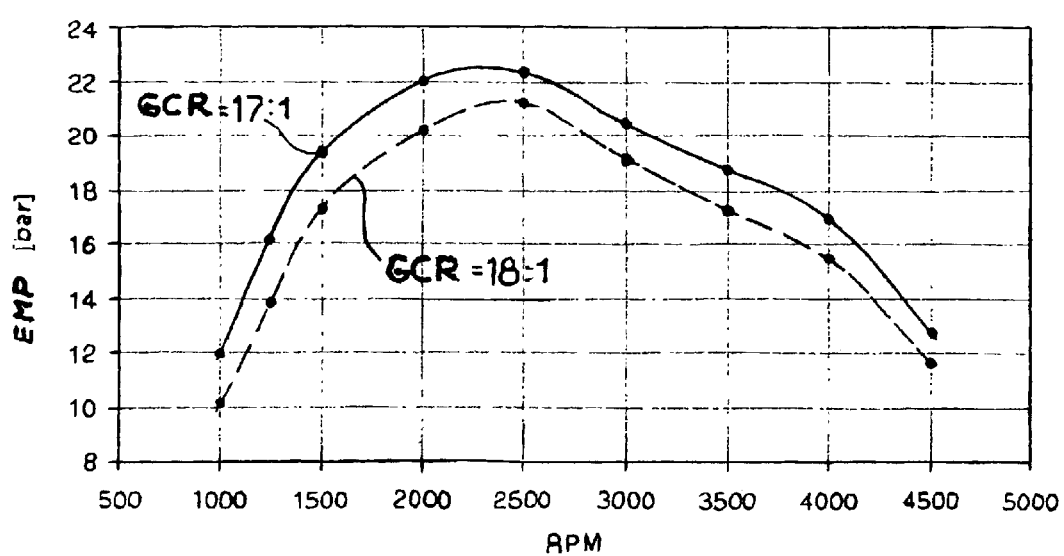
Fig_9

MULTI-CYLINDER DIESEL ENGINE WITH VARIABLY ACTUATED VALVES

BACKGROUND OF THE INVENTION

The present invention relates to multi-cylinder Diesel engines of the type employing variably actuated valves.

In American patent U.S. Pat. No. 6,237,551, the Applicant has already proposed an engine of this type including:

- two inlet valves and two exhaust valves for each cylinder, each equipped with respective elastic means of return that push the valve towards its closed position, for controlling the respective inlet and exhaust ports,
- at least one camshaft for operating the inlet and exhaust valves of the engine's cylinders via respective valve lifters, each inlet valve and the two exhaust valves being controlled by a respective cam of the said camshaft,
- in which each of the said valve lifters commands the respective inlet or exhaust valve against the action of the said elastic means of return via the interposition of hydraulic means including a pressurized fluid chamber.
- the pressurized fluid chamber associated with each inlet valve or with the two exhaust valves being suitable for connection via a solenoid valve to a discharge channel, for the purposes of decoupling the valve from its respective valve lifter and provoking rapid closure of the valve under the effect of the elastic means of return,
- electronic means of control for controlling each solenoid valve for varying the time and travel of the respective inlet or exhaust valve according to one or more of the engine's operating parameters,
- in which each cam on the engine camshaft has a profile such that it tends to provoke the opening of the respective inlet valve or respective exhaust valves that it controls, not only during the conventional opening phase of the engine's normal operating cycle, but also in certain additional phases of the cycle,
- in which the said electronic means of control are capable of provoking the opening of each solenoid valve to maintain the respective inlet valve or the respective exhaust valves closed during the above-mentioned conventional phase and/or during one or more of the said additional phases in which the respective cam would tend to provoke the opening of the valve, in consequence of which the engine can be made to selectively run according to different modes of operation controlled by the said solenoid valves, and
- in which the profile of the cam controlling the exhaust valves is such as to cause an additional opening phase of the exhaust valves substantially during the final part of the induction phase, thereby realizing an operating cycle of the so-called "post-charging" type, where, due to excess pressure in the inlet port, the opening of the exhaust valves during the final part of the induction phase causes fresh air to first flow directly from the inlet port to the exhaust port, while successively, following the increase in pressure in the exhaust port, part of the air returns from the exhaust port, entering the cylinder by exploiting the excess pressure in the exhaust port, thereby improving cylinder replenishment.

SUMMARY OF THE INVENTION

The object of the present invention is that of further perfecting the previously proposed engine for the purposes of achieving a series of advantages with regards to reducing harmful exhaust emissions and/or overcoming problems of cold starting or creating the so-called "blue smoke" in the "warm-up" phase after a cold start, and/or achieving improved performance and/or consumption reductions.

In order to achieve this objective, the subject of the invention is an internal combustion engine possessing all of the above indicated characteristics and also characterized by the fact that the cam controlling each inlet valve is shaped such that it provokes the opening of the respective inlet valve during the engine's normal exhaust phase to accomplish exhaust gas recirculation (EGR) inside the engine, due to the fact that during the normal exhaust phase part of the exhaust gas passes from the cylinder into the inlet port, and then returns to the cylinder during the next induction phase, while part of the exhaust gas that previously passed into the exhaust port returns into the cylinder during this induction phase due to the said additional opening of the exhaust valve, in consequence of which the exhaust gas charges that return to the cylinder participate in the combustion on the next engine cycle.

Thanks to internal EGR, it is possible to achieve substantial reductions in consumption and emissions at low revs and loads when cold. As can be seen, to realize both the "post-charging" cycle and internal EGR, an additional opening of the exhaust valves is needed during the induction phase. Nevertheless, maximum efficiency in the two cases is achieved with a different law and lift timing for the exhaust valves. Thanks to the use of variably actuated valves, it is possible to employ a cam with a predetermined geometry to achieve both objectives, since the aforesaid electronic means of control that intervene can realize, for a given cam geometry, different lift geometries for the exhaust valves.

In traditional engines, internal EGR can only be realized in a limited measure, as there would otherwise be an excessive reduction in the "swirl" of the air charge introduced into the cylinder due to the introduction of a mass of burnt gases with an angular motion that is null, or low or in the opposite direction. According to another characteristic of the invention, in order to significantly reduce emissions via an increase in internal EGR tolerability, the end sections of the two inlet ports associated with each cylinder are shaped such that one channels air into the cylinder in an almost tangential direction, while the other, having a spiral shape, generates a rotating vortex around an axis that is substantially parallel to the axis of the cylinder, the said electronic means of control being capable of controlling the two inlet valves associated with these ports in a differentiated manner and so modulate the level of "swirl" within the cylinder. In fact, the first inlet port, with the tangential outlet, is suitable for generating significant "swirl" from the first stages of inlet valve opening, while the second port has the function of "replenishment" and only generates "swirl" in synergy with the first. In this way, it is possible to choke air induction whilst maintaining high swirl, thereby avoiding the risks of stalling that are generated due to excessive EGR. Keeping the first port open and choking valve lift on the second minimises losses due to the surge effect, which have a negative effect on consumption.

Thanks to control over the effective compression ration, the engine according to the invention can also exploit, in the same manner as the known engine already proposed, the possibility of designing an engine with a relatively low geometric compression ratio, in the order of 17:1 for example or even lower. The electronic means of control can thus be set up to close the inlet valve after bottom dead centre at maximum revolutions and loads and to instead advance the closure of the inlet valve to bottom dead centre during starting. In this way, when starting, all of the cylinder's internal volume is exploited to avoid the risk of misfire and producing "blue smoke" due to low pressure and temperature, because all of the engine's geometric compression ratio is exploited, whilst at maximum revolutions and loads a law for valve lift similar to the conventional one is used.

According to another characteristic of the invention, the electronic means of control are set up to advance the closure of the inlet valves and/or to advance the opening of the exhaust valve on cold starts in order to reduce the flow of air through the engine and, in consequence, for a given amount of heat transferred to the exhaust gas, to increase exhaust temperature, to obtain the same result. Thanks to these characteristics, it is possible to obtain an increase in exhaust gas temperature during warm-up that is useful for activating exhaust gas post-treatment systems (catalysers and traps). In certain known engines, this result is achieved via a butterfly valve inserted in the inlet port, which has the drawback however of limited dynamic response.

Naturally, the fact that the engine according to the invention exploits an EGR system within the engine does not exclude the possibility of also using external EGR. In general, internal EGR (hot) is not as efficient as external EGR (cooled) in reducing nitrogen oxides. In any case, internal EGR (hot) can be used for reducing nitrogen oxides during the first phases of engine warm-up where the amount of external EGR cannot be maximised due to its low temperatures, which results in excessive emission levels of carbon and hydrocarbon oxides.

Another important advantage of the engine according to the invention, deriving from the possibility of using internal EGR, is that of obtaining an HCCI (Homogeneous Charge Compression Ignition) type of combustion. In fact, the variable valve actuation system can accurately control high internal EGR doses and dilute the charge to render it almost stoichiometric, simultaneously controlling its temperature by mixing with external EGR (cold). This is extremely important because the temperature of the charge influences the ignition delay caused by the high rarefaction of the mixture and, thanks to the high concentration of active radicals present in hot EGR, it can accelerate the speed of combustion.

The system also allows improved charge homogenisation and stratification. The control of the inlet and exhaust valves in a differentiated manner can be adjusted according to the engine's state of operation and allow stratification of air and internal EGR in a controllable manner. From the viewpoint of controlling self-ignition and combustion, the combination of this stratification of gases with the possibility of introducing fuel in small packets (multiple injection) allows homogenisation and/or stratification of the fuel/air/residual gases right from the very first phases of induction. In addition, the injection of a small amount (pilot) of fuel during the last phases of compression allows the charge to be locally enriched and guarantees its ignition and combustion.

The use of an oxygen sensor opportunely positioned on the engine exhaust allows continuous correction in the actuation of the valves and/or the introduction of fuel for correcting the effective mixture strength of each cylinder on a cycle-by-cycle basic.

Finally, the cycle-by-cycle control of air and internal EGR provided by the variable valve actuation system permits transition from HCCI combustion to conventional Diesel combustion without any vehicle driveability problems.

In the engine switch-off phase, inlet and/or exhaust valve lifts are modulated to minimise compression pressure inside the cylinder and, in consequence, torque oscillations on the engine shaft. This strategy significantly reduces engine/vehicle shaking and substitutes the butterfly device, inserted in the inlet line, which is currently used for the same purposes.

In addition, the possibility of selectively closing both the inlet and exhaust valves of any cylinder, even while running, allows the other cylinders to operate with higher charges and thus in a more efficient manner in terms of fuel consumption (modularity).

BRIEF DESCRIPTION OF THE DRAWINGS

Further characteristics and advantages of the invention will become clear from the description that follows, supplied merely as a non limitative example and with reference to the enclosed drawings, where:

FIGS. 2 and 3 are partial sectional views in a plane perpendicular to the axis of the cylinders and in a plane parallel to the axis of the cylinders of the cylinder head of a four-cylinder Diesel engine according to the invention, FIGS. 4 and 5 show a schematic perspective view and a plan view that illustrate the shape of the inlet and outlet ports associated with a single cylinder of the engine shown in FIGS. 2 and 3, FIGS. 6 and 7 illustrate diagrams showing the lift of the inlet and the exhaust valves, in different operating conditions, of the engine according to the invention and realized with the support of the variable valve actuation system, FIGS. 8(A)–8(G) schematically illustrate the operating cycle of the engine according to the invention and realized for the purpose of obtaining internal EGR, and FIG. 9 illustrates a diagram showing the advantages deriving from the possibility of adopting a lower geometric compression ratio, as permitted by the invention.

DETAILED DESCRIPTION OF THE INVENTION

Figure 1:
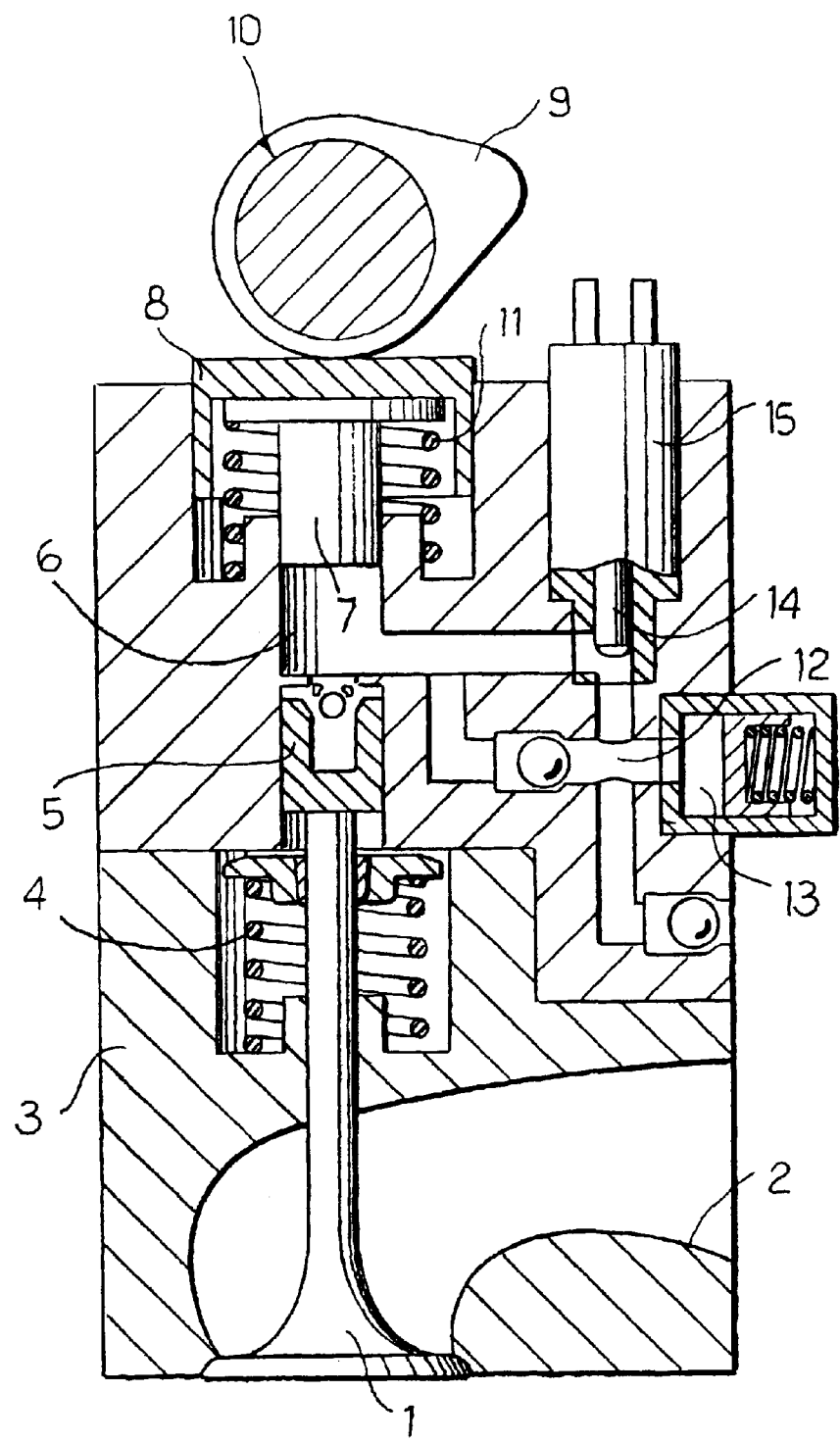
FIG. 1 is a schematic view that illustrates the principle of operation of a variable valve actuation system in an internal combustion engine.

FIG. 1 schematically illustrates the principle of operation of a variable valve actuation system in an internal combustion engine. Reference number 1 indicates the valve (which can be either an inlet valve or an exhaust valve) as a whole, associated with a respective port 2 (inlet or exhaust) formed inside the cylinder head 3 of an internal combustion engine. The valve 1 is drawn towards its closed position (upwards with reference to FIG. 1) by a spring 4, while it is forced to open by a piston 5 acting on the upper end of the valve stem. The piston 5 is in turn controlled via oil under pressure that is present in the chamber 6, by a piston 7 that supports a spring cup 8 cooperating with a cam 9 on a camshaft 10. The spring cup 8 is held in sliding contact with the cam 9 by a spring 11. The pressure chamber 6 can be connected to a port 12, which in turn communicates with a pressure accumulator 13, via the shutter 14 of a solenoid valve 15 that is commanded by the electronic means of control (not illustrated) according to the engine's operating conditions. When the solenoid valve 15 is opened, oil under pressure inside the chamber 6 is discharged, causing the valve 1 to rapidly close under the effect of the return spring 4.

When the solenoid valve 15 is closed, the oil present in the chamber 6 transmits the movements of the piston 7 to the piston 5 and thus to the valve 1, in consequence of which the position of the valve 1 is determined by the cam 9. In other words, the cam 9 normally controls the opening of the valve 1 according to a cycle that depends on the profile of the cam, but it can be "disabled" any time it is wished by opening the solenoid valve 15, thereby interrupting the connection between the piston 7 and the valve 1.

The present invention refers to the application of the above described variable valve actuation system to a multi-cylinder Diesel engine, especially the type suited for utilization in automobiles, but also the application of any other type of variable valve actuation system with the same or similar characteristics.

Figure 2:
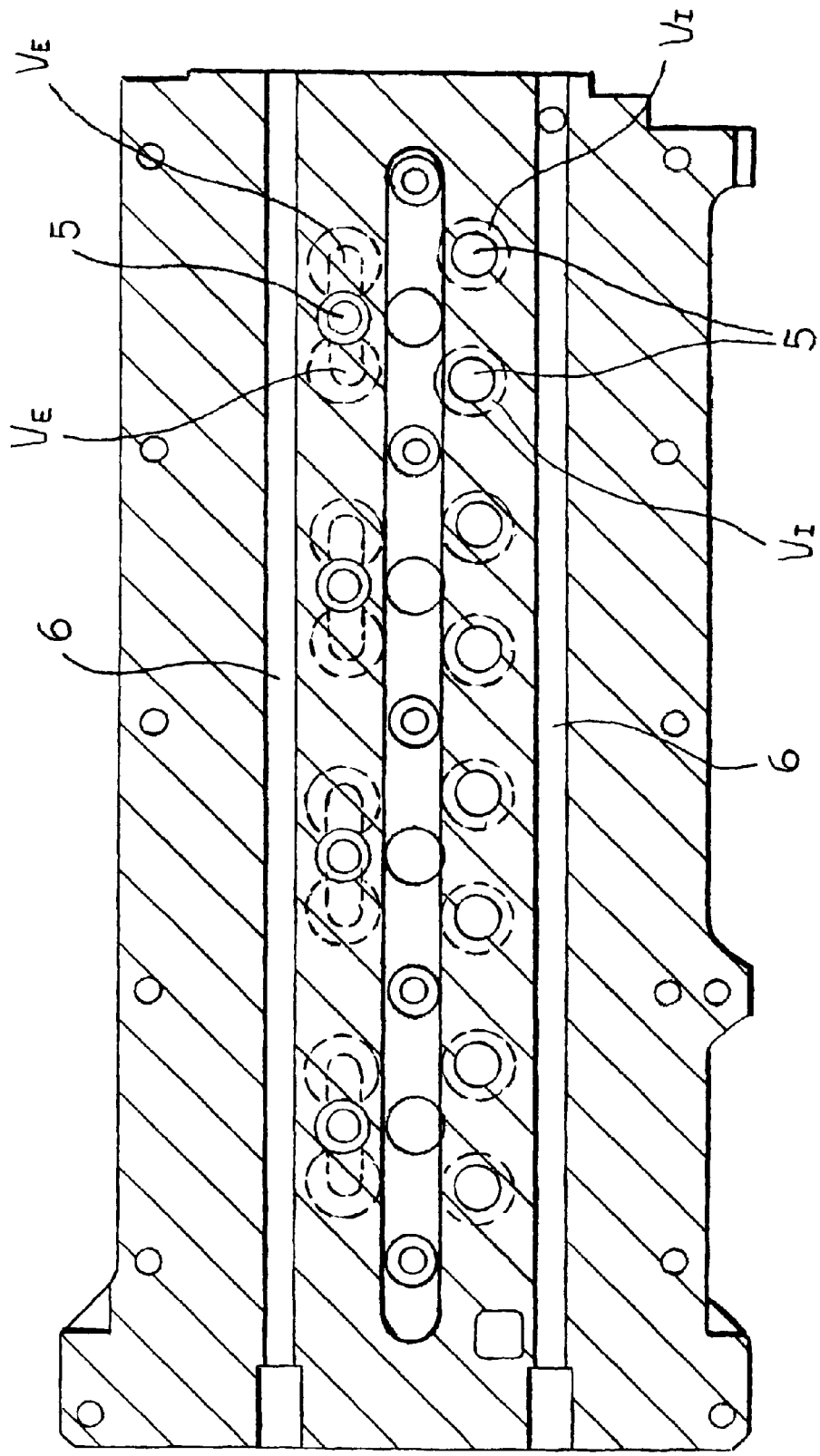

FIGS. 2 and 3 schematically illustrate the cylinder head of such an engine, incorporating two inlet valves $V_I$ and two exhaust valves $V_E$ for each cylinder. Each pair of exhaust valves $V_E$ is controlled by a single actuator piston 5 via a crosspiece 16, whilst the two inlet valves $V_I$ of each cylinder are controlled by separate actuator pistons 5.

With reference to FIGS. 4 and 5, reference E indicates the two exhaust ports associated with each engine cylinder, while $I_1$, and $I_2$ indicate the inlet ports.

As can clearly seen in FIG. 5, the first inlet port $I_1$, is shaped to direct the flow of air entering the cylinder in a direction $F_1$, substantially tangential with respect to the axis 17 of the cylinder. The second inlet port $I_2$ has instead a spiral shaped end section that generates an air vortex $F_2$, rotating around an axis substantially parallel to the axis of the cylinder 17, at the entrance to the cylinder.

FIGS. 6 and 7 are diagrams that illustrate the lift of the engine's inlet and exhaust valves, respectively indicated as A and S, corresponding to operating conditions suitable for realising "post-charging", as already illustrated in the foregoing, and to operating conditions suitable for realising internal EGR. For this purpose, the inlet and exhaust valve control cams have a main protuberance destined to realize the normal lifting of the valves during the normal induction and exhaust phases of the Diesel cycle, and an additional protuberance destined to realize a supplementary lift of the exhaust valve during the normal induction phase (FIGS. 6 and 7) and of the inlet valve during the normal exhaust phase (see FIG. 7). Notwithstanding the fact that the geometry of the control cam is fixed, the valve lift diagrams in FIGS. 6 and 7 are different, because the closure of the inlet valve can be advanced (see FIG. 6) via the variable valve actuation system emptying the pressure chamber before the "natural" closure of the inlet valve, and because the supplementary exhaust valve opening phase during the induction phase can be varied in lift and duration, always as a result of the variable actuation of the valves (compare the S diagram to the right in FIGS. 6 and 7).

As has just been explained above, the mode of operation that is realized with the valve lifts illustrated in FIG. 6 allows a "post-charging" type of cycle to be achieved, where the additional opening of the exhaust valve during the last phase of induction ensures that part of the air entering the cylinder during the induction phase passes directly from the inlet port to the exhaust port, from where it is subsequently forced to return to the cylinder by the pressure wave created in the exhaust manifold due to the fact that another engine cylinder is in the exhaust phase, with the consequent advantage of improving engine breathing and increasing low-speed torque. The variable valve actuation system allows the inlet valve to be closed in a modifiable manner, with the aim of optimally exploiting the pressure wave that is created in the exhaust.

In the operating mode corresponding to the valve lift diagrams illustrated in FIG. 7, a supplementary lift of the exhaust valve is always present during the final part of the induction phase, but with a different timing and duration of opening with respect to the case of supplementary lift illustrated in FIG. 6. In addition, in this case a supplementary lift of the inlet valve occurs during the initial part of the exhaust phase. This mode of operation is also illustrated in the sketches in FIGS. 8(A)–8(G). FIG. 8(A) illustrates the cylinder in the combustion phase, with the inlet and exhaust valves closed. FIG. 8(B) illustrates the situation in the first part of the exhaust phase, with the inlet valve closed and the exhaust valve open. In this phase, the piston rises up expelling the combusted gases B through the exhaust port. FIG. 8(C) illustrates the situation in a successive part of the exhaust phase, when the inlet valve has opened, in consequence of which a part $B_A$ of the combusted gases enters the inlet port and the inlet manifold. FIG. 8(D) illustrates the situation immediately after the inlet valve closes during the exhaust phase. In this phase, a quantity $B_A$ of the combusted gases remains trapped in the inlet port, while the exhaust valve is always open to allow the discharge of the combusted gases. FIG. 8(E) illustrates the successive, normal induction phase, in which the exhaust valve is closed and the inlet valve is open. In this phase, the quantity of exhaust gases $B_A$ that remained trapped in the inlet port re-enters the cylinder. The exhaust valve is closed. In the final part of normal induction phase, the supplementary opening of the exhaust valve (FIG. 8(F)) permits a second charge of combusted gas $B_S$ that was previously present in the exhaust port to re-enter the cylinder under the effect of the depression within the cylinder. FIG. 8(G) illustrates the situation after closure of the inlet valve and the end of the supplementary exhaust valve opening phase, in which the two quantities of exhaust gas $B_A$ and $B_S$ are trapped within the cylinder, together with the charge of fresh air A. Thus, the combusted gases $B_A$ and $B_S$ participate in the combustion of the successive combustion phase, thereby realizing exhaust gas recirculation (EGR) inside the engine.

According to the invention, it is possible to selectively carry out the above-described dual actuations of the valves or just one of them.

In addition, it is possible to anticipate exhaust valve closure and thereby trap the residual gases inside the cylinder.

EGR allows fuel consumption and emissions to be reduced in cold-running conditions at low revolutions and loads. As can be seen, maximum efficiency of the system is achieved with the supplementary exhaust valve lift, which has different timing and duration in the case of post-charging (FIG. 6) and in the case of EGR (FIG. 7). However, from studies undertaken by the Applicant, the possibility of using a single cam profile for both functions has emerged, as the variable actuation of the valves allows regulation of exhaust valve closure as well as the timing and duration of the exhaust valve's supplemental opening.

In an engine according to the invention, the realization of internal EGR, in the mode of operation illustrated in FIG. 7, is found to be particularly advantageous when used in combination with the inlet port geometry illustrated in FIGS. 4 and 5. In fact, the introduction of internal EGR via the reopening of the exhaust valve attenuates swirl in the cylinder due to the introduction of a mass of combusted gases with an angular motion that is null or low or in the opposite direction. The possibility of actuating the two inlet valves in a differentiated manner, in combination with the different geometry of the inlet ports $I_1$, and $I_2$ allows the swirl to be increased by counteracting or cancelling the aforesaid negative effect. In fact, the port $I_1$ generates high swirl from the first stages of opening in the induction phase, while port $I_2$ has the function of replenishment, only generating swirl in synergy with the first port $I_1$. Thus, by actuating the two inlet valves in a differentiated manner, it is possible to modulate the swirl, significantly reducing harmful exhaust emissions thanks to the increase in EGR tolerability. This solution is definitely more effective than the traditional solution that uses a butterfly-valve choke in the inlet port, which does not guarantee perfect sealing and introduces secondary currents between the closed port and the cylinder. On the other hand, if the closure of one of the two inlet valves introduces losses due to the surge effect, with negative effects on consumption, the variable valve actuation system allows this negative effect to be minimised thanks to the possibility of partially opening the second inlet valve. As has already been stated, this actuation, opportunely timed and controlled, allows high swirl to be maintained inside the cylinder with smaller surge effect losses and gives rise to a better consumption/emission trade-off.

Instead, with regard to the "post-charging" effect realized with the mode of operation illustrated in FIG. 6, the variable valve actuation system allows this effect to be generated and optimized over the wider range of useful engine revolutions. By regulating the closure of the inlet valves, it is possible to achieve a consistent increase in performance in a much wider zone of the quoted plane. The variable valve actuation device also provides the possibility of excluding the post exhaust valve lift at medium-high running conditions, where its presence is not desired could be counterproductive.

As has also been previously described, thanks to control of the effective compression ratio, the variable valve attraction system allows a lower geometric compression ration (GCR) to be adopted, with corresponding benefits in terms of performance as is clearly evident from the diagram in FIG. 9, which shows the graph of effective mean pressure against engine speed for geometric compression ratios of 17:1 (upper curve) and 18:1 (lower curve). As has been thoroughly described in the foregoing, the variable valve actuation system provides the benefit of being able to perform engine starting with the inlet valves being closed at the bottom dead centre, thereby exploiting all of the geometric compression ratio and avoiding problems of stalling and blue smoke due to low pressure and temperature levels. At maximum revs revolutions and loads, closure of the inlet valve is delayed until after bottom dead centre, while at intermediate speeds it is regulated to guarantee ignition, minimize temperature and reduce harmful emissions.

As has already been described above, according to another characteristic of the invention, the engine is controlled in a manner that raises the exhaust gas temperature for activating the post-treatment systems (catalysers and traps) on cold starts. This is achieved by advancing closure of the inlet valve to reduce the flow of air through the engine, and thus, for a given amount of heat transferred to the exhaust gas, to increase exhaust temperature. The same effect can also achieved by advancing the opening of the exhaust valve.

Always according to the invention, control of the engine is provided for the purposes of realizing a HCCI type of combustion via internal EGR dosing, as has already been described in the foregoing. Furthermore, as has also been described in the foregoing, the system can be controlled to obtain charge homogeneity and stratification, closed-loop control of the engine, with the aid of an oxygen sensor positioned on the exhaust, and the transition from HCCI to normal combustion without any vehicle driveability problems. In addition, as has already been described in the foregoing, the engine can be controlled in a manner to minimize the compression pressure within the cylinder and, in consequence, torque oscillations on the engine shaft during the switch-off phase.

Still with reference to the mode of operation that accomplishes internal EGR, it should be noted that internal EGR (hot) is generally not as efficient in reducing nitrogen oxides as recirculation systems realized externally to the engine, which permit cooling of the gases. Nevertheless, internal EGR (hot) can be used to reduce nitrogen oxides during the first phases of engine warm-up after starting, where external EGR cannot be used due to its low temperature, resulting in excessive emission of carbon and hydrocarbon oxides.

Naturally, the principle of the invention being understood, the constructional details and forms of embodiment could be extensively changed with respect to that described and illustrated, by way of example, without leaving the scope of this invention.

What is claimed is:

1. A multi-cylinder Diesel engine, comprising:

two inlet valves and two exhaust valves for each cylinder, each valve equipped with respective elastic means of return that push the valve towards the closed position, for controlling the respective inlet and exhaust ports, at least one camshaft for operating the inlet and exhaust valves of the engine's cylinders via the respective valve lifters, each inlet valve and the two exhaust valves being controlled by a respective cam of the said camshaft, in which each of said valve lifters commands the respective inlet or exhaust valve against the action of the elastic means of return via the interposition of hydraulic means including a pressurized fluid chamber, the pressurized fluid chamber associated with each inlet valve or with the two exhaust valves being suitable for connection via a solenoid valve to an discharge channel for the purpose of decoupling the valve from its respective valve lifter and provoking rapid closure of the valve under the effect of the elastic means of return, electronic means of control for controlling each solenoid valve to vary the time and travel of the respective inlet or exhaust valve according to one or more of the engine's operating parameters, in which each cam on the engine camshaft has a profile such that it tends to provoke the opening of the respective inlet valve or the respective exhaust valves that it controls, not only during the convention opening phase of the engine's normal operating cycle, but also in certain additional phases of the cycle, in which said electronic means of control are capable of provoking the opening of each solenoid valve to maintain the respective inlet valve or the respective exhaust valves closed during the abovementioned conventional phase and/or during one or more of said additional phases in which the respective cam would tend to provoke the opening of the valve, in consequence of which the engine can be made to selectively run according to different modes of operation controlled by said solenoid valves, and in which the profile of the cam controlling the exhaust valves provokes an additional opening phase of the exhaust valves, substantially during the final part of the induction phase, thereby realizing a post-charging operating cycle where the opening of the exhaust valves during the final part of the induction phase causes fresh air to first flow directly from the inlet port to the exhaust port, due to excess pressure in the inlet port, while successively, following the pressure increase in the exhaust port after the inlet valve is closed, part of the air returns from the exhaust port and enters the cylinder exploiting the excess pressure in the exhaust port, thereby improving cylinder replenishment, said engine also being wherein the control cam of each inlet valve is shaped to such that it provokes the opening of the respective inlet valve during the engine's normal exhaust phase to accomplish exhaust gas recirculation inside the engine, due to the fact that during the normal exhaust phase part of the exhaust gas passes from the cylinder into the inlet port, and then returns to the cylinder during the next induction phase, while part of the exhaust gas that previously passed into the exhaust port returns into the cylinder during this induction phase due to said additional opening of the exhaust valve, in consequence of which the exhaust gas charges that return to the cylinder participate in the combustion on the next engine cycle.

2. A multi-cylinder Diesel engine according to claim 1, wherein the ends of the two inlet ports associated with each cylinder are shaped such that one channels air into the cylinder in a almost tangential direction, while the other, with a spiral shape, generates a rotating vortex around an axis substantially parallel to the axis of the cylinder, the said electronic means of control being capable of controlling the two inlet valves associated with these ports in a differentiated manner and so modulate the level of within the cylinder.

3. A multi-cylinder Diesel engine according to claim 1, wherein the electronic means of control can be set up to close the inlet valve after bottom dead centre at maximum revolutions and loads and to instead advance the closure of the inlet valve to bottom dead centre during starting.

4. A multi-cylinder Diesel engine according to claim 3, wherein said engine has cylinders with a geometric compression ratio less than or equal to 17:1.

5. A multi-cylinder Diesel engine according to claim 1, wherein the electronic means of control are set up to advance the closure of the inlet valves and/or to advance the opening of the exhaust valve on cold starts in order to reduce the flow of air through the engine and, in consequence, for a given amount of heat transferred to the exhaust gas, to increase its temperature and so activate exhaust gas treatment systems.

6. A multi-cylinder Diesel engine according to claim 1, wherein it includes means for introducing fuel into the cylinder in small packets, via multiple injections right from the earliest stages of induction, thereby realizing, also due to the internal EGR mechanism, a stratification of the fuel-air-residual gas charge, which permits control of self-ignition and combustion.

7. A multi-cylinder Diesel engine according to claim 1, wherein it includes means for injecting a small quantity of pilot fuel during the last stages of compression that permits local enrichment of the charge and ensures its ignition and combustion.

8. A multi-cylinder Diesel engine according to claim 1, wherein it includes an oxygen sensor positioned on the engine's exhaust, said electronic means of control being set up to carry out continual correction to the actuation of the valves and/or manner, on the basis of the signal generated by said sensor, to correct the effective mixture strength of each cylinder on a cycle-by-cycle base.

9. A multi-cylinder Diesel engine according to claim 1, wherein said electronic means of control are set up to modulate the lift of the inlet and/or exhaust valves during engine switch-off to minimize the compression pressure inside the cylinder and, in consequence, also the torque oscillations on the engine shaft.

10. A multi-cylinder Diesel engine according to claim 1, wherein said electronic means of control are set up to selectively exclude cylinders and so raise the load on the others and, in consequence, their thermal efficiency, thereby minimizing fuel consumption.

* * * * *